United States Patent [19]

Kato

[11] Patent Number: 4,502,402
[45] Date of Patent: Mar. 5, 1985

[54] SEWING MACHINE WITH PATTERN EDITING FUNCTION

[75] Inventor: Kenji Kato, Tokyo, Japan

[73] Assignee: Janome Sewing Machine Co. Ltd., Tokyo, Japan

[21] Appl. No.: 513,979

[22] Filed: Jul. 14, 1983

[30] Foreign Application Priority Data

Jul. 15, 1982 [JP] Japan ............................. 57-122082

[51] Int. Cl.³ .............................................. D05B 3/02
[52] U.S. Cl. .............................. 112/158 E; 112/158 F
[58] Field of Search ....................... 112/121.12, 121.11, 112/158 E, 103, 158 F

[56] References Cited

U.S. PATENT DOCUMENTS

| 4,188,893 | 2/1980 | Shimazaki | 112/158 E X |
| 4,341,170 | 7/1982 | Beckerman et al. | 112/158 F X |
| 4,352,334 | 10/1982 | Childs et al. | 112/103 X |
| 4,413,574 | 11/1983 | Hirota et al. | 112/158 E X |

Primary Examiner—Peter Nerbun
Attorney, Agent, or Firm—Michael J. Striker

[57] ABSTRACT

An electronic sewing machine including an electronic device for editing the selected stitch patterns by indicating and combining a plurality of unit patterns into a composite pattern.

A plurality of unit patterns are indicated on a liquid crystal indicating device. A number of accessible buttons are provided on the sewing machine to correct the position and inclination of the patterns imaged on the indicating device. A program control device is provided for optionally combining the unit patterns to produce the edited composite pattern.

2 Claims, 8 Drawing Figures

FIG_1
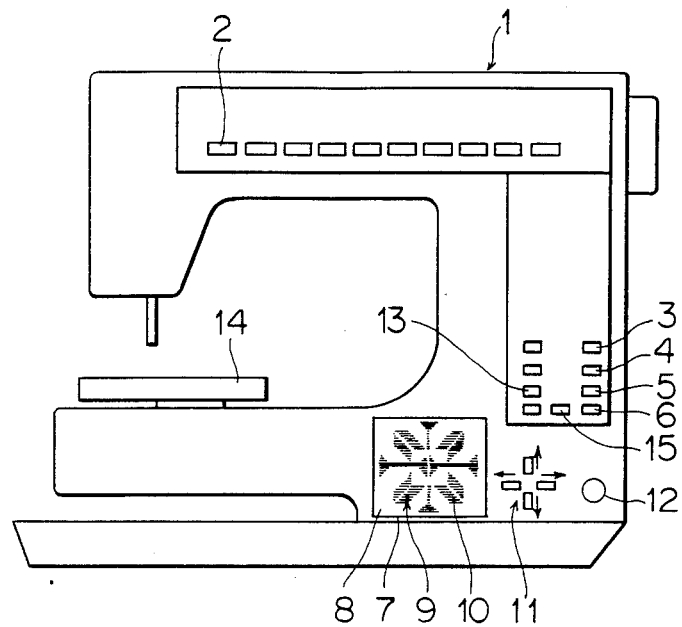
FIG_2
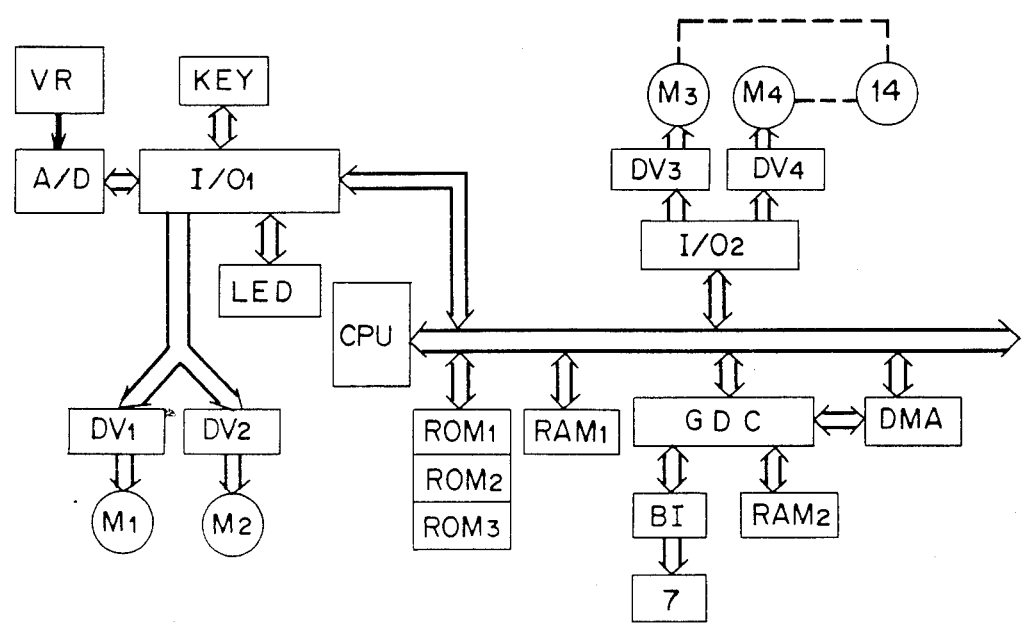

FIG_3
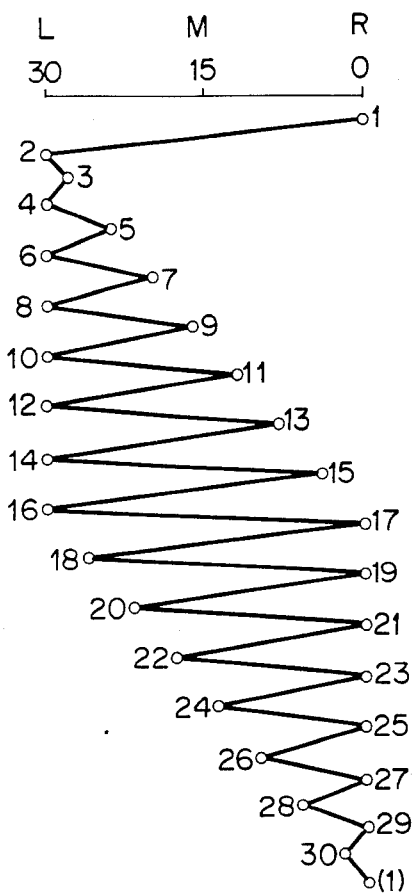
| Stitch | Needle position |
|---|---|
| 1 | 0 |
| 2 | 30 |
| 3 | 28 |
| 4 | 30 |
| 5 | 24 |
| 6 | 30 |
| 7 | 20 |
| 8 | 30 |
| 9 | 16 |
| 10 | 30 |
| 11 | 12 |
| 12 | 30 |
| 13 | 8 |
| 14 | 30 |
| 15 | 4 |
| 16 | 30 |
| 17 | 0 |
| 18 | 26 |
| 19 | 0 |
| 20 | 22 |
| 21 | 0 |
| 22 | 18 |
| 23 | 0 |
| 24 | 14 |
| 25 | 0 |
| 26 | 10 |
| 27 | 0 |
| 28 | 6 |
| 29 | 0 |
| 30 | 2 |
FIG_5
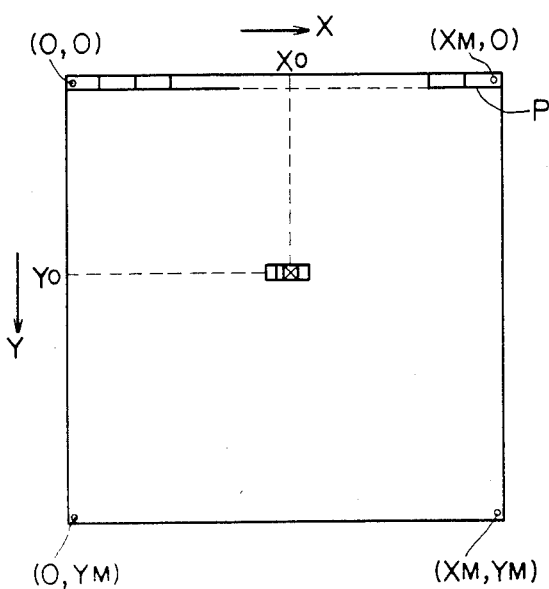

FIG_4
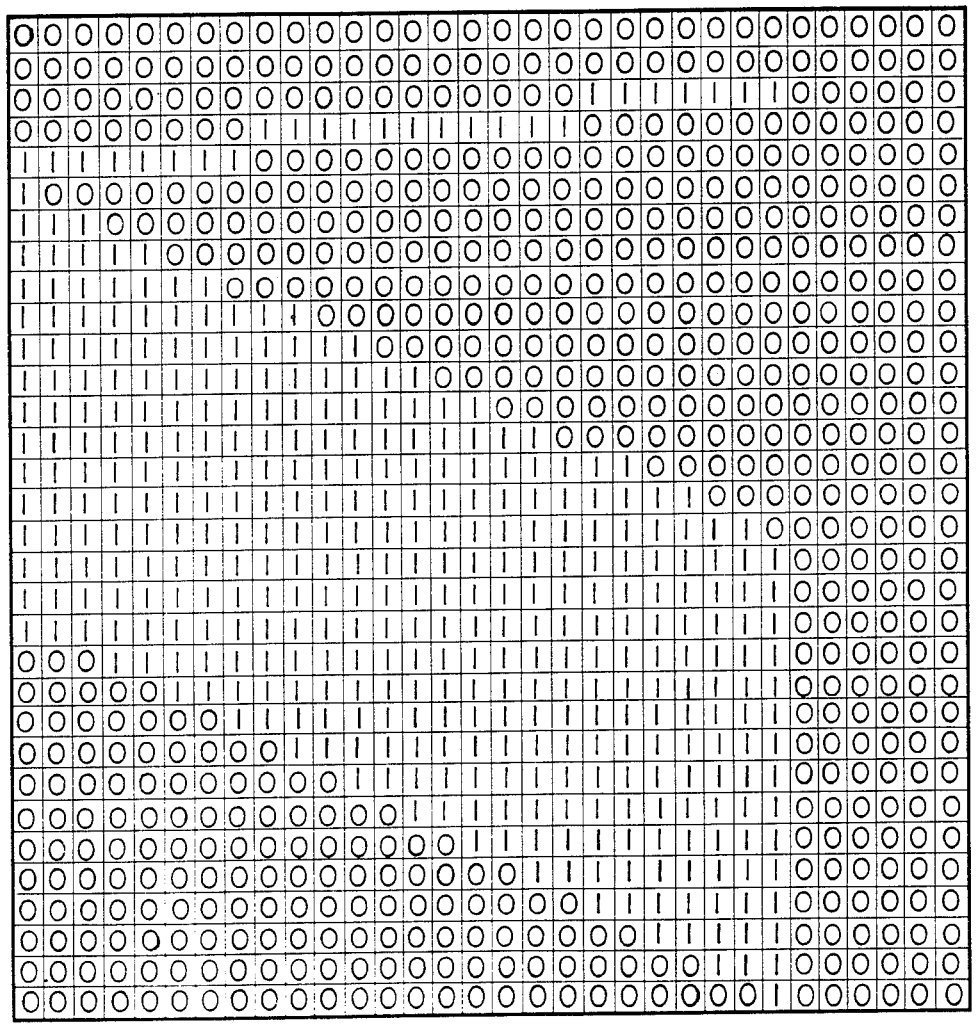

FIG_6
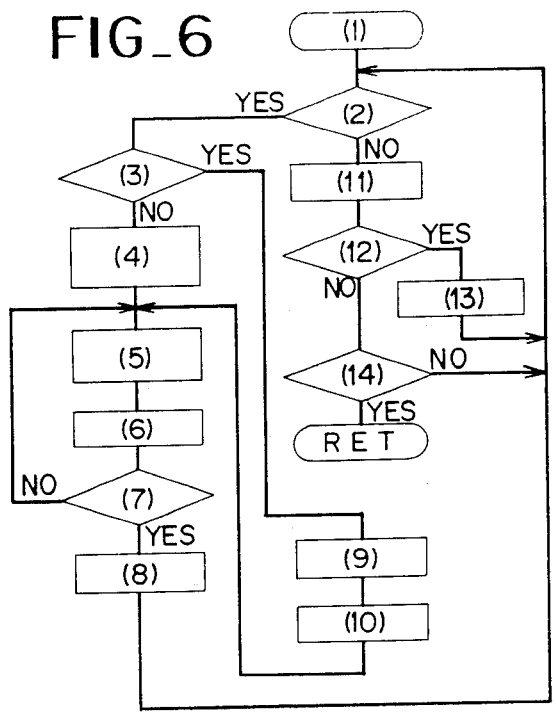
FIG_7
FIG_8
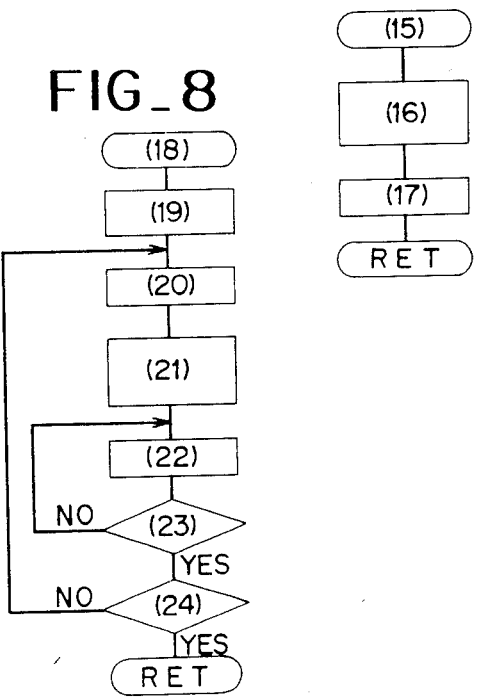

1

SEWING MACHINE WITH PATTERN EDITING FUNCTION

BACKGROUND OF THE INVENTION

The invention relates to a sewing machine including means for controlling the stitches of patterns by electronic stitch control signal, and more particularly relates to a sewing machine with a device for editing the patterns by indicating and combining a plurality of unit patterns into a synthesized pattern. It has been possible to produce a new pattern with combination of a plurality of stitch patterns to be formed by the conventional sewing machine. In this case, the machine operator has to generally depend on the manual or guidebook provided by the machine maker, or carries our test stitching with the imagination of accomplished pattern, and reproduces the same pattern upon confirmation of the result of test stitching but it is not preferable for meeting various patterns to be formed.

SUMMARY OF THE INVENTION

An object of the invention is to indicate a plurality of unit patterns on a liquid crystal indicating device or on a cathode ray tube device and maintain said indication of patterns, and, while observing the indicated unit pattern, optionally combine these unit patterns by changing the position or inclination per each of the designated unit patterns to thereby produce a synthesized pattern for generating new patterns of large size and, if necessary, to apply the above operation to the pattern stitch formation based on the pattern stitching operation by X-Y control of a sewing machine.

The present invention is intended to select a prepared unit pattern for composing coupled patterns and show all the images of the selected patterns on the liquid crystal device or cathode ray tube device. Further with respect to the images of the selected patterns, it is necessary, according to he invention, to change or vary the position and inclination of the pattern image per each of the designated unit patterns, while observing the images, to thereby form a synthesized or composite pattern due to mutual relation of the unit patterns. According to the invention, the indication signals are read out from the indication signal storing device per each of the selections of the patterns by program control such as the micro-computer, and are stored as image data in an image signal storing device for indicating the images on the indication device. Further, the invention is intended to rewrite the contents of the image signal storing device per each of the operations of the indication pattern control device with respect to said pattern in order to control conditions of the shown image.

BRIEF DESCRIPTION OF THE DRAWINGS

FIG. 1 shows a side view of a sewing machine according to the invention;

FIG. 2 is a block diagram of a control circuit;

FIG. 3 shows a series of stitches of unit patterns;

FIG. 4 is an example of stored indication signals of the unit patterns;

FIG. 5 is an explanatory view of a storing system of an image signal storing device; and FIGS. 6, 7 and 8 are control flow charts.

DETAILED DESCRIPTION OF THE PREFERRED EMBODIMENTS

An embodiment of the invention will be explained with reference to the drawing. In FIG. 1, a sewing machine 1 has a plurality of pattern selecting buttons 2 provided at a front panel thereof, and a plurality of pattern indications (not shown) printed at corresponding portions above the pattern selecting buttons 2. By operation of the pattern selecting buttons 2 and with operating a number therof, a desired pattern is selected and a corresponding indication is lighted. An editing button 3, a registering button 4, a cancelling button 5 and a correcting button 6 are for editing the patterns together with the pattern selecting button 2. A second operation of the editing button 3 is for designating finish of the edition. An indicating device 7 comprises a liquid crystal television display of small size. In patterns 9 appearing on an indicator panel 8, a pattern 10 is a unit pattern selected by the pattern selecting button 2. Displacing buttons 11 comprise four operating buttons for displacing the indicating position coordinate of the designated unit pattern 10 in the directions as shown by the arrow marks by the amount in response to the operating time. An inclination changing dial 12 varies the inclination angle of the unit pattern by the amount in response to the rotating operation. A plurality of color selecting buttons 13 is adapted to select colors indicatingthe unit pattern. The instant embodiment shows, as one example, the sewing machine provided with an embroidering frame 14. A reproduction operating button 15 is for designating a formation of the edited patterns.

FIG. 2 illustrates a control block diagram, in which a program storing device ($ROM_1$) fixedly stores each of the program control signals. ($ROM_2$) stores each of the stitch control signals of the patterns to be formed by the sewing machine. A signal storing device ($ROM_3$) stores each of the indicating signals for indicating the shapes of patterns. A central processing unit (CPU) is for controlling each of the programs. A random access memory ($RAM_1$) is for temporarily storing the processes and the results of the programs. ($I/O_1$)($I/O_2$) are input and output ports. The above mentioned elements of ($ROM_1$)($ROM_2$)($ROM_3$)(CPU)($RAM_1$)($I/O_1$)($I/O_2$) constitute a micro-computer. A key matrix (KEY) is composed of switches which are operated by the pattern selecting switches 2, the operating buttons 11, the pattern editing buttons 3, 4, 5, 6 and the color selecting button 13, and is controlled by (CPU). An inclination control port (VR) comprises a variable resistor which is operated by the pattern inclination varying dial 12, and a controlled value thereof is converted into a digital value by an analog-digital converter (A/D), and the corresponding data are used for the program control by the micro-computer. A lighting indicator (LED) is for showing the results of operation of the pattern selecting buttons 2. Drivers ($DV_1$)($DV_2$) are a needle position control motor ($M_1$) and a fabric feed control motor ($M_2$), and are controlled by the program. A graphic display controller (GDC) is LSI for controlling the indicated images, and is generally known as, NEC-μPD7220. The graphic display controller (GDC) is subject to the program control, and receives signals from an indication signal storing device ($ROM_3$) via a dynamic memory access (DMA) so as to store the corresponding signals into an image signal storing device ($RAM_2$) or to read out the signals therefrom and to give the signals to a video interface (BI) which is for converting the contents of the image signal storing device (RAM$_2$) into the signals suitable to an indicating device 7 of the liquid crystal television. Drivers (DV$_3$)(DV$_4$) drive embroidering frame control motors (M$_3$)(M$_4$) and give X-Y control to the embroidering frame 14. The stored contents of the stitch signal storing device (ROM$_2$) may be represented in the table shown in FIG. 3, for example, with respect to the unit pattern 10, in which the needle position control data are shown in the decimal position coordinates in relation to the needle positions 1–30. As the fabric feed data are constant, these are not shown. The stored contents of the indication signal storing device (ROM$_3$) are shown in FIG. 4 with respect to the unit pattern 10, and are read out in the direction of an arrow mark and from the upper stage to the lower stage. As shown, the binary data are used to form a square, and the data 1 are arranged, for example to give the image substantially identical to the unit pattern as shown in FIG. 3. Regarding the storing manner of the image signal storing device (RAM$_2$), assuming that, as shown in FIG. 5, the coordinates are distributed in a square in space and are each represented in the decimal numbers progressively increasing in the X and Y directions, the storing places are provided such that a coordinate of left upper corner is (O, O), that of right upper corner is (X$_M$, O)(herein X$_M$ is 255), a left lower corner is (O, Y$_M$)(herein Y$_M$ is 255), and a right and lower corner is (X$_M$, Y$_M$). The data of the storing place representatively shown by a rectangle divided into 4 blocks at the central portion of the square in FIG. 5, each comprising data of 2-bit, and each block corresponds to one pattern element so that the data may designate 4 kinds of colors. Said 4 blocks correspond to one address.

The rectangles at the uppermost stage in FIG. 5 are also each divided into 4 blocks, and are 64 in all. With respect to memorization (inscription) and reading-out in each of the blocks, its storing place is designated by a couple of designation of said address and designation of the block. The data of the designated place is based on the data shown in FIG. 4. For example, the block X shown at the cross point between X and Yo is designated with such formula that the address is "PYo+INT (Xo/n) and the block is "REM(Xo/n)". Herein "n" is the number of the block in response to 1 address and in the present case "n" is 4. INT(Xo/n) is numerical figure of integer portion resulting from calculation in (Xo/n). P is expressed with "INT{(X$_M$+1)/n} and is 64, from which is the number of the rectangles in the first stage. Accordingly, the first item of the formula for obtaining the address is the total number of the rectangles in all the upper stages, except the stage of Yo and the second item shows the number of the rectangles at the left side, except the rectangles belonging to Xo in the stage of Yo. REM(Xo/n) is surplus calculated within (Xo/n) and expresses the counted number as 1, 2, 3, 4 (4 in response to the surplus 0) from the left with respect to the rectangles to which Xo belongs in response to said surplus.

With respect to mutual relationship between the memory space concerning the unit pattern in the indication signal storing device (ROM$_3$) shown in FIG. 4, and the memory space of the image signal storing device (RAM$_2$) shown in FIG. 5 and the indication space of the indicating device 7 shown in FIG. 1, the number of pattern elements of the image signal storing device (RAM$_2$) is 256×256=65536, and the indicating device 7 indicates the images with the same number of pattern elements, and on the other hand the number of the pattern elements for the unit patterns in the indication signal storing device (ROM$_3$) is 32×32=1024, so that the space shown in FIG. 4 may be arranged 8×8=64 in the space shown in FIG. 5. Regarding the indicating data of the unit pattern as shown in FIG. 4, the data for the pattern element at the center of the pattern is representative of the position of said pattern. The inclination of the unit pattern is arbitrarily varied around said representative position by rotation of the inclination changing dial 12. The representative position is moved by the displacing buttons 11 to said divisions of 64 in the space shown in FIG. 5. The present position of the movement is indicated in the indicating device 7 via the cursor display. The edited pattern is stored by operation of the registering button 4 in the temporary storing device (RAM$_1$) as the data for the four standard colors, the positions of 64 divisions and for 16 standard inclinations, and those data are used for forming the edited pattern stitches. The edited stitching patterns are formed by operation of the reproducing button 15.

Operation of the invention will be explained below. FIG. 6 is a flow chart for editing the pattern images. The image editing program is started by first operation of the editing button 3. When the pattern is not selected, the cursor is positioned at the left upper corner (starting position) of the indicating panel 8, and is ready for pattern selection. When a desired pattern is selected by operation of the pattern selecting buttons 2, since in this case a correcting flag later mentioned is not elected, the indicating signal for the selected pattern is called up from the indication signal storing device (ROM$_3$) to designate the indication of said pattern and the cursor at the starting position of the indicating panel 8. The data from the indication signal storing device (ROM$_3$) are converted per each of the designations by operation of the displacing buttons 11, the inclination changing dial 12 and the color selecting button 13, and is stored and rewritten in the image signal storing device (RAM$_2$), and concurrently imaged on the indicating panel 8. The program waits for operation of the registering button 4 for registering the operated results such as sorts of the designated patterns and the positions thereof in the temporary storing device (RAM$_1$). In this case, the precededly selected pattern is moved outside of the starting position in order to call up a new pattern at the starting position by operation of the displacing button 11 prior to the operation of the registering button 4.

When the pattern selecting button 2 is operated to select a new pattern, this pattern is imaged on the indicator panel 8 and registered by operating the registering button 4. The indicating device 7 maintains the indications of the two patterns. In such a manner, a plurality of patterns are called up and are indicated in parallel on the indicator panel 8. In order to correct the unit patterns thus indicated, the cursor is moved to an indicated position of a desired unit pattern by the displacing button 11, and when the correcting button 6 is operated, the correcting flag is elected and waits for pattern selecting order at the position of the cursor. In order to correct the pattern instead of changing it, this pattern is designated by the pattern selecting button. When changing is necessary, the desired pattern is designated. If these designations are made, the patterns designated are called up at the position of the cursor, and the flag is cancelled and the program waits for operations of the buttons 11, 12, 13. The designated patterns are corrected by operating each of these buttons. When the registering button 4 is operated, its result is registered. While each of the patterns is repeatedly corrected, a synthesized or composite pattern is edited which is made by combining the unit patterns with one another. When the editing is completed and then the editing button 3 is again operated, the editing program is finished. In order to cancel the pattern on the position of the cursor in the process of the editing program, the cancelling button 5 is operated, then an interrupting routine is carried out as shown in FIG. 7 and said cancelling is performed.

In order to stitch the edited pattern by means of the embroidering frame 14, the reproducing button 15 is operated to carry out a program for reproducing the stitch as shown in FIG. 8. Analysis or arrangement of information as to ordering and settling for production of the unit patterns are practiced to read out the codes concerning the editing informations registered in the random access memory ($RAM_1$). Then the data of the image signal storing device ($ROM_2$) concerning the edited pattern are converted into the stitch information for controlling the embroidering frame 14 while the data are analyzed into the information for the position, inclination and color of the pattern. When the sewing machine is driven, each of the unit patterns is stitches, and when all the patterns are stitched, the stitch reproduction program is finished.

As stated above, in accordance with the present invention, due to the sort of the unit pattern, the arrangement and the inclination thereof are, during editing the patterns, corrected as observing the shown images, whereas the present invention is convenient to generation of the patterns to be combined. It is possible to automatically stitch the edited patterns by X-Y control. Further, in the ordinary sewing machine, the pattern is stitched as changing the colors of the threads in reference to the image of the edited pattern.

It will be understood that each of the elements described above, or two or more together, may also find a useful application in other types of sewing machines without differing from the types described above.

While the invention has been illustrated and described as embodied in a pattern editing function, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of the prior art, fairly constitute essential characteristics of the generic or specific aspects of the invention.

What is claimed as new and desired to be protected by Letters Patent is set forth in the appended claims:

1. An electronic sewing machine with a pattern forming device which changes a relative position between a needle of the sewing machine and a fabric to be sewn, and forms stitched patterns, which comprises:
   first memory means for storing stitch control signals for controlling said pattern forming device to produce stitches of the patterns;
   indicating means indicating a plurality of patterns;
   pattern selecting means including a plurality of pattern-selecting switches selectively operated in reference to indicated patterns to select desired patterns from said first memory means;
   said indicating means being activated in response to selective operations of said pattern-selecting switches to sequentially indicate the selected patterns;
   second memory means for storing indication signals of the selected patterns indicated of said indicating means;
   pattern adjusting means including a plurality of accessible members selectively operated to adjust and correct the position and inclination of the patterns indicated on said indicating means;
   third memory means for temporarily storing signals activated in response to said indication signals to operate said indicating means;
   signal control means being responsive to said indication signals read out from said second memory means to transmit and read out said indication signals into and from said third memory means under a control of said adjusting means and to rewrite the signals stored in said third memory means in response to the operation of said pattern adjusting means; and
   pattern editing program control means to programmingly control the reading-out of said indication signals from said second memory means, the operation of said signal control means, the signal storing of said third memory means, the rewriting of the signals stored in said third memory means by said signal control means, the reading-out of said stitch control signals from said first memory means, and a temporary memorizing of the operations of all above mentioned means;
   so as to combine the corrected patterns and form a composite pattern.

2. The sewing machine as defined in claim 1, wherein said accessible members of the adjusting means include a plurality of switching buttons and an inclination dial.

* * * * *